(No Model.)
J. A. LESOURD & J. LOTAN.
ENDLESS CHAIN CARRIER AND DISTRIBUTER FOR COAL, &c.
No. 281,087. Patented July 10, 1883.
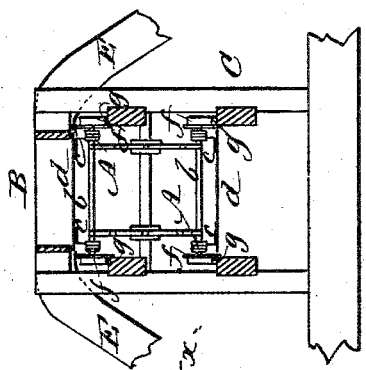
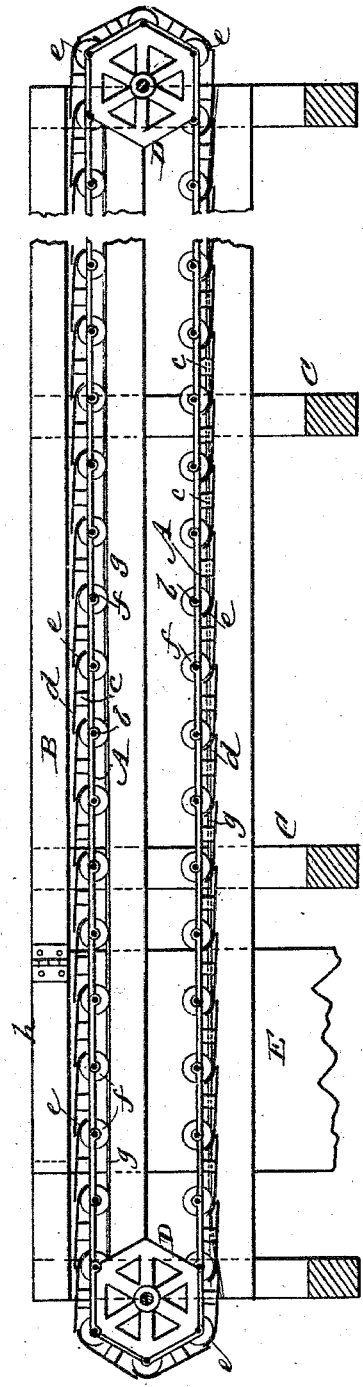
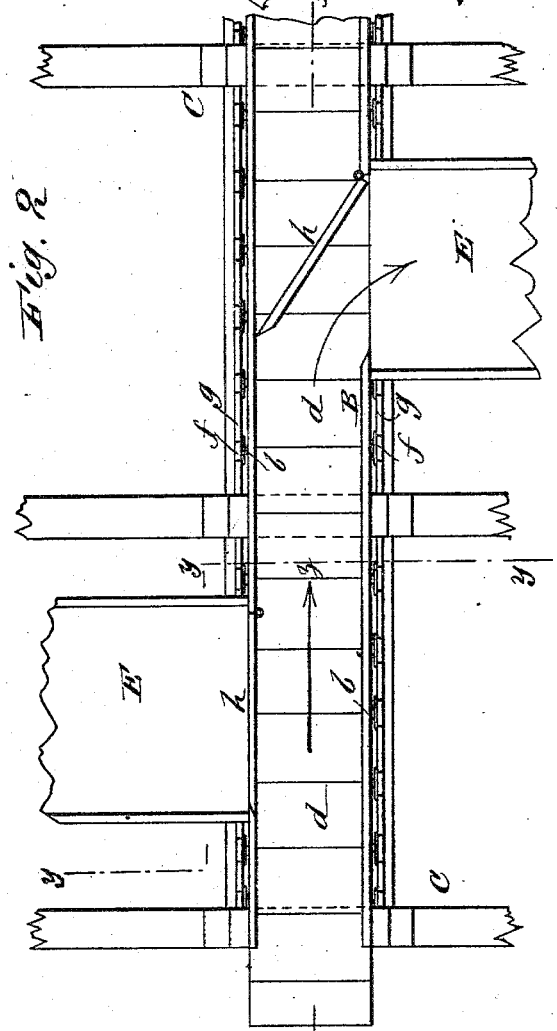
WITNESSES:
C. Sedgwick
A. Turcott.
INVENTOR:
J. A. Lesourd
J. Lotan
BY Munn & Co.
ATTORNEYS.

UNITED STATES PATENT OFFICE.

JOHN A. LESOURD AND JAMES LOTAN, OF PORTLAND, OREGON.

ENDLESS-CHAIN CARRIER AND DISTRIBUTER FOR COAL, &c.

SPECIFICATION forming part of Letters Patent No. 281,087, dated July 10, 1883.

Application filed January 13, 1883. (No model.)

*To all whom it may concern:*

Be it known that we, JOHN A. LESOURD and JAMES LOTAN, both of Portland, in the county of Multnomah and State of Oregon, have invented certain new and useful Improvements in Endless-Chain Carriers and Distributers for Coal and other Substances, of which the following is a full, clear, and exact description.

This invention is mainly designed for conveying and distributing coal; but it is equally applicable for conveying and distributing other substances or materials. It will here, however, be described as used for transferring coal.

The invention consists in certain peculiar constructions of an endless-chain carrier and distributing devices connected therewith, whereby an improved continuous floor-surface and easier-running action are obtained for the carrier. Provision is made for varying the points or places of distribution, and the running surface or track is kept clear, as hereinafter fully described, and pointed out in the claims.

Reference is to be had to the accompanying drawings, forming part of this specification, in which similar letters of reference indicate corresponding parts in all the figures.

Figure 1 represents a longitudinal vertical section, on the line $x\ x$ in Fig. 2, of a coal carrier and distributer constructed in accordance with our invention. Fig. 2 is a partial plan of the same, and Fig. 3 a vertical transverse section thereof on line $y\ y\ y$ in Fig. 2.

The carrier is composed in part of an endless chain or parallel endless chains, A A, united by cross-shafts $b$ at the joints of the links of the chains. Attached to the several links by suitable projections, $c$, are plates $d$, extending across the combined chains, and arranged to overlap one another at their rear ends, and to bend or curve inward and underlap one another at their forward ends, $e$. These plates virtually form a continuous surface to all intents and purposes, which is the same as if it were made all of or from one piece. Said endless-chain carrier works, in its upper course or travel, beneath or within a longitudinal distributer, B, to which the plates $d$ form the bottom, and on the ends of the shafts $b$ are small flanged wheels or rollers $f$, which run upon rails $g$ in the sides of a main or general frame, C, which carries the distributer B, and may serve also to carry the wheels or pulleys D at the ends of the whole structure, with and round which the endless chains move. The wheels $f$ support the carrier between the end pulleys, both when at rest and in motion, and provide for its easy run. The curved ends $e$ of the plates $d$ provide for the working of the plates relatively to each other when moving with and round the end wheels or pulleys, D, and assist in making a close continuous surface for the articulated floor of the carrier.

Motion may be imparted to the carrier by any suitable means, and, if practicable or convenient, the whole carrier and distributer may be set slightly inclining downward in a forward direction, thereby materially reducing the amount of power necessary to drive the carrier.

In the operation of the apparatus the coal, which may be raised by an elevator and dumped into a chute that permits it to slide on the rear upper end of the carrier, is conveyed by the carrier, which moves, as indicated by the arrow $z$, along the distributer B till it is intercepted by any one of a series of hinged lids or gates, $h$, when opened or adjusted obliquely across the carrier for the purpose. These gates form portions of the sides of the distributer, and, accordingly as they are opened or closed, pass the coal by chutes E down to the bins or other receptacles below, or continue its passage along the distributer, as desired. The chutes E and gates $h$, of which there may be any number, are arranged at any suitable distances apart, preferably on opposite sides of the distributer, whereby the coal may be discharged at different points, and on opposite sides alternately, if desired. This may be done without stopping the carrier.

To prevent coal or material from falling onto the tracks, the chutes E are constructed at their upper ends to cover the tracks and permit of the wheels $f$ passing under them, as shown in Fig. 3 of the drawings.

Having thus described our invention, what we claim as new, and desire to secure by Letters Patent, is—

1. The combination, with the endless chains A A, of the plates $d$, secured to the center of the length of the links of the chains by projections c, and provided with inwardly-curved rear ends, e, substantially as herein shown and described.

2. The combination, with the frame C, provided with the ways g, and the distributer B, having hinged gates h, of the endless chains A A, united by the cross-shafts b, the plates d, secured to the center of the length of the links of the chain, and having inwardly-curved rear ends, e, and the chutes E, having their upper ends extending over the tracks of the frame, substantially as herein shown and described.

JOHN A. LESOURD.
JAMES LOTAN.

Witnesses:
J. V. BEACH,
H. B. NICHOLAS.